United States Patent
Pai et al.

(10) Patent No.: US 10,686,873 B2
(45) Date of Patent: Jun. 16, 2020

(54) SEAMLESS TRANSITION OF A VIDEO SESSION BETWEEN A MESH TOPOLOGY AND A CENTRALIZED BRIDGE TOPOLOGY

(71) Applicant: Polycom, Inc., San Jose, CA (US)

(72) Inventors: Deep Subhash Pai, Pune (IN); Dragan Ignjatic, Belgrade (RS)

(73) Assignee: Polycom, Inc., San Jose, CA (US)

(*) Notice: Subject to any disclaimer, the term of this patent is extended or adjusted under 35 U.S.C. 154(b) by 208 days.

(21) Appl. No.: 15/221,371

(22) Filed: Jul. 27, 2016

(65) Prior Publication Data

US 2017/0272512 A1 Sep. 21, 2017

(30) Foreign Application Priority Data

Mar. 16, 2016 (IN) .............................. 201631009178

(51) Int. Cl.
 *H04L 29/08* (2006.01)
 *H04L 29/06* (2006.01)
 *H04W 84/18* (2009.01)

(52) U.S. Cl.
 CPC ...... *H04L 67/1002* (2013.01); *H04L 65/1069* (2013.01); *H04L 65/4046* (2013.01); *H04L 65/4053* (2013.01); *H04L 65/608* (2013.01); *H04L 65/80* (2013.01); *H04L 67/02* (2013.01); *H04L 67/104* (2013.01); *H04L 67/14* (2013.01); *H04L 67/42* (2013.01); *H04W 84/18* (2013.01)

(58) Field of Classification Search
 None
 See application file for complete search history.

(56) References Cited

U.S. PATENT DOCUMENTS

| 7,379,450 | B2 * | 5/2008 | Gu | ...................... H04L 12/1818 370/261 |
| 9,674,242 | B1 * | 6/2017 | Fritz | .................. H04L 65/4038 |
| 2005/0165894 | A1 * | 7/2005 | Rosenberg | ........ H04L 29/06027 709/205 |
| 2007/0237099 | A1 * | 10/2007 | He | ...................... H04L 12/1822 370/260 |
| 2009/0220066 | A1 * | 9/2009 | Shaffer | .................. H04M 3/56 379/204.01 |
| 2010/0067680 | A1 * | 3/2010 | Hanson | ............... H04M 3/4285 379/202.01 |

(Continued)

FOREIGN PATENT DOCUMENTS

| EP | 2863632 A1 | 4/2015 |
| EP | 3163869 A1 | 5/2017 |
| WO | 2016019775 A1 | 11/2016 |

OTHER PUBLICATIONS

EPO Search Report received in copending EP Application No. 17161350.8 dated Jul. 19, 2017, 13 pages.

(Continued)

*Primary Examiner* — Thomas J Dailey
(74) *Attorney, Agent, or Firm* — Blank Rome, LLP

(57) ABSTRACT

A technique is disclosed for making transitions between mesh and bridge topology seamless to the end user of the video session, without a significant gap between the audio and video experience of the video session when the transition occurs. In addition, a function provides a way for determining whether a trigger event for such a transition has occurred.

20 Claims, 11 Drawing Sheets

(56) References Cited

U.S. PATENT DOCUMENTS

| | | | |
|---|---|---|---|
| 2010/0121961 A1* | 5/2010 | Elleuch | H04L 12/1822 |
| | | | 709/228 |
| 2011/0019593 A1 | 1/2011 | Stephen et al. | |
| 2014/0219435 A1* | 8/2014 | Chaturvedi | H04M 3/562 |
| | | | 379/202.01 |
| 2015/0271447 A1 | 9/2015 | Glass et al. | |
| 2015/0288926 A1 | 10/2015 | Glass et al. | |
| 2016/0119583 A1* | 4/2016 | Bhandari | H04N 7/152 |
| | | | 348/14.09 |

OTHER PUBLICATIONS

MMusic WG Schulzrinne/Rosenberg Columbia U/Bell Laboratories, "SIP Call Control Services," Internet Engineering Task Force, IETF, Standardworkingdraft, Internet Society (ISOC), Jun. 17, 1999, 33 pages.

Schulzrimme H et al, "Signaling for Internet Telephony," Proceedings of the International Conference on Networkprotocol, Oct. 1, 1998, 27 pages.

\* cited by examiner

SEAMLESS TRANSITION OF A VIDEO SESSION BETWEEN A MESH TOPOLOGY AND A CENTRALIZED BRIDGE TOPOLOGY

TECHNICAL FIELD

The present invention relates to the field of videoconferencing, and in particular to a technique for transitioning a video session between a mesh topology and a centralized bridge topology or a centralized selective forwarding unit.

BACKGROUND ART

A full mesh peer-to-peer topology in a video conference is achieved by setting up independent audio/video real-time RTP streams between each participant of the conference such that each participant transmits one audio/video stream to each other participant and receives the same from each other participant. The main advantage of a full mesh conference by way of comparison to the more traditional centralized bridge conference method is the lower latency of media and the elimination of bottlenecks in the form of centralized media servers. Mesh conferencing also is more cost efficient in terms of cloud resources. On the other hand, full mesh peer-to-peer topology cannot be scaled beyond a certain number of participants per session due to bandwidth limitations. In such case a bridge topology where media is sent to a centralized media server is more efficient and scalable.

In case of multi-party conference call in meshed mode all the participants send their media to each other directly. If this meshed call is escalated to bridged mode (due to legacy endpoints joining the conference or exceeding the maximum number of participants in meshed mode) then all the participants in existing conference call are forced to join the conference call on an Audio/Video Bridge such as a multi-point control unit (MCU). This transition from a meshed call to a bridged call creates a disruption in the already running conference. This escalation or transition sometimes takes more than an expected length of time, producing a blackout period in the conference call. Thus, users experience discontinuity in the video and audio streams of their conference call when escalation happens.

Since the network and device capability are changing rapidly, the criteria to decide a mesh call to a bridge call can be very dynamic. Currently the criteria are mainly the number of participants. With the increase in the network bandwidth, and the use of mobile endpoints and standards like WEBRTC ("Web Real-Time Communication") there are other factors that can affect the user experience in a meshed-based conference call. This can create very bad experiences for users if their device is not capable of supporting the number of streams needed for the conference or the network conditions are not good.

SUMMARY OF INVENTION

To fully utilize the advantages of both topologies, we use a hybrid approach where the video session starts with a mesh topology and then escalates or transitions to a bridge topology based on a number of criteria such as available bandwidth, number of participants, need for recording etc. Similarly the bridge topology can deescalate or transition to a mesh topology when the number of participants decreases or other such criteria.

In the discussion below, we propose a technique for making such transitions between mesh and bridge topology seamless to the end user of the video session, i.e. without a significant gap between the audio and video experience of the video session when the transition occurs. In addition, a function is described for triggering the transitions.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
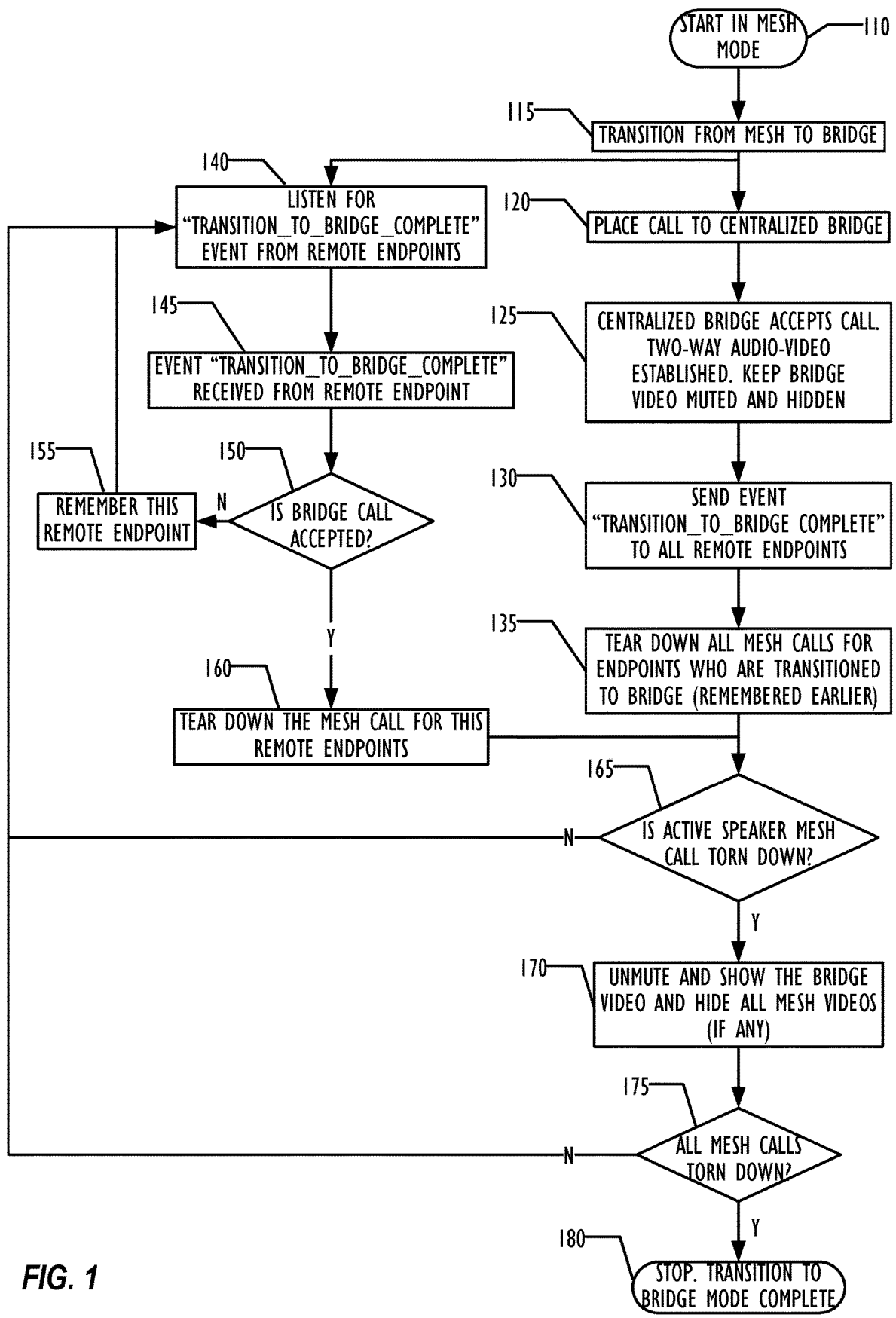
FIG. 1 is a flowchart illustrating a technique for seamlessly transitioning a videoconferencing session from a mesh topology to a bridge topology according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

In the following description, the conference call or conference session may be either audio-only, video-only, or a mixture of audio and video. In addition, although not illustrated in the Figures for clarity, data-only streams may be provided in the conference session. The terms "call" and "session" are used synonymously herein. In addition, the terms "participant" and "endpoints" are used interchangeably, even though multiple people may participate at any given endpoint.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

Seamless Transitioning from a Mesh Topology to a Bridge Topology:

When an endpoint has to transition from mesh topology to bridge topology, the endpoint sets up an audio/video stream with the bridge, creating a bridge connection. The endpoint terminates the mesh connections for the mesh streams only after both endpoints of a particular mesh stream have joined the bridge. This provides continuity and a smooth transition for the audio experience, however, is insufficient for a seamless video transition. The bridge stream video is hidden at the endpoint until the current active speaker on the mesh call has transitioned to the bridge at which point the bridge video is shown and all of the remaining mesh videos (if any) are hidden. This provides continuity for the video experience.

FIG. 1 is a flowchart illustrating a technique for performing a transition from mesh mode to bridge mode according to one embodiment.

At the beginning in block 110, the endpoint is in an audio/video session in mesh mode. In block 115, the endpoint receives an event to trigger the transition from mesh mode to bridge mode. This event could be due to any criteria such as a change in the number of participants, a change in bandwidth, etc.

In block 140, the endpoint listens for a "transition_to_bridge_complete" event from all other endpoints. In block 145, the endpoint detects this event received from another endpoint. The endpoint determines in block 150 whether all endpoints have transitioned to bridge mode. If not, the endpoint remembers that the other endpoint has completed the transition to a bridged session and returns to listening for additional "transition_to_bridge_complete" events in block 140.

At same time as the endpoint starts listening for the "transition_to_bridge_complete" event, endpoint also initiates an audio/video stream to the centralized bridge in block 120. The centralized bridge accepts the call and two-way audio/video streams are established with the centralized bridge in block 125. In one embodiment, the endpoint keeps the remote video muted in the bridge session to save bandwidth. Audio from both the mesh streams and the bridge stream is audible at this time.

In block 130, the endpoint broadcasts a "transition_to_bridge_complete" event to all other endpoints. The endpoint then tears down in block 135 the mesh audio/video stream of only those remote endpoints from which the endpoint has already received the "transition_to_bridge_complete" event.

The endpoint continues to listen for "transition_to_bridge_complete" events from remote endpoints, tearing down in block 160 the mesh audio/video streams as the event is received.

When the endpoint terminates the mesh stream for the remote endpoint who is the current active speaker as determined in block 165, the endpoint hides all the mesh video streams (if any) and shows only the bridge video stream in block 170.

When "transition_to_bridge_complete" events have been received from all the remote endpoints, as determined in block 175, there are no more mesh connections and the transition to bridge completes in block 180. The "transition_to_bridge_complete" designation is illustrative and by way of example only, and any designation for the event may be used.

Figure 2:
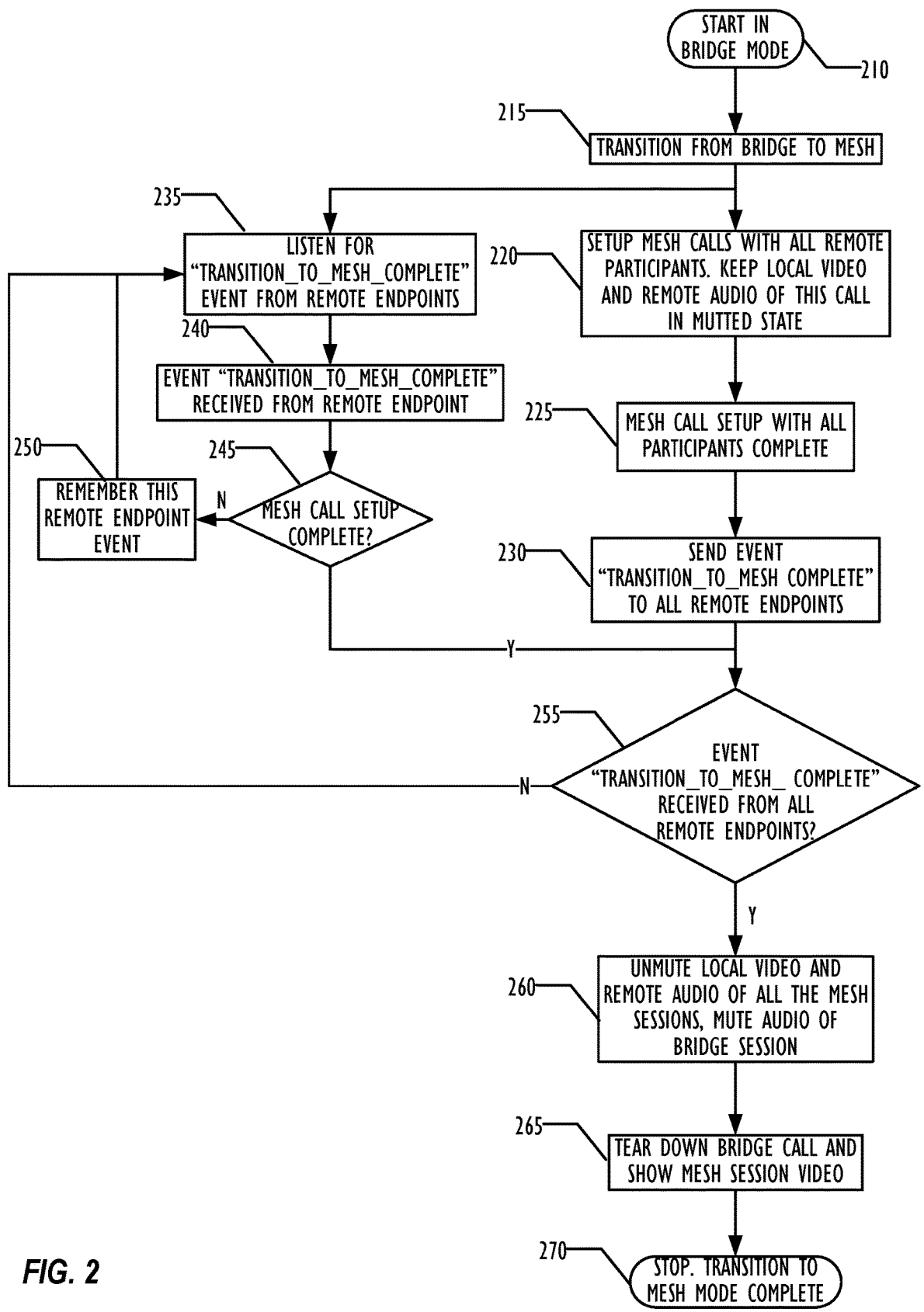
FIG. 2 is a flowchart illustrating a technique for seamlessly transitioning a videoconferencing session from a bridge topology to a mesh topology according to one embodiment.

FIG. 2 is a flowchart illustrating a similar technique for seamless transition from bridge mode to mesh mode according to one embodiment.

When a endpoint has to transition from bridge topology to mesh topology, the endpoint sets up mesh connections for audio/video streams with all the remote endpoints. The mesh streams are setup with local video muted and remote audio in muted state to save bandwidth and avoid double audio. Once the complete mesh topology is setup between all the endpoints, the endpoint unmutes the local video and remote audio on the mesh streams and terminates the bridge connection for the bridge stream.

At each endpoint endpoint, as illustrated in FIG. 2, at block 210 the endpoint is currently in a video session in bridge mode. The endpoint receives an event in block 215 to trigger the transition from bridge mode to mesh mode. This event could be due to any criteria such as a change in the number of participants, a change in bandwidth, etc.

In block 235, the endpoint listens for "transition_to_mesh_complete" events from other endpoints. On receiving this event in block 240, in block 245 the endpoint determines whether the transition is complete for all endpoints and if not, in block 250 the endpoint remembers which endpoints have already completed transition to mesh.

As the endpoint listens for "transition_to_mesh_complete" event, the endpoint starts setting up mesh audio/video streams with all the remote endpoints in block 220. These mesh streams are initiated with their local video and remote audio in muted state. The local video is muted to keep the bandwidth down and remote audio is muted to prevent double audio from the same participant.

When the setup of mesh calls with all the remote endpoints is complete in block 225, the endpoint sends out a "transition_to_mesh_complete" event to all remote endpoints in block 230.

When the "transition_to_mesh_complete" event is received from all the remote endpoints as determined in block 255, this endpoint unmutes the local video and remote audio in the mesh calls in block 260, tears down the bridge stream and shows the mesh call videos streams in block 265. The transition to mesh mode is then complete in block 270. The "transition_to_mesh_complete" designation for the event is illustrative and by way of example only, and any designation may be used.

Figure 3:
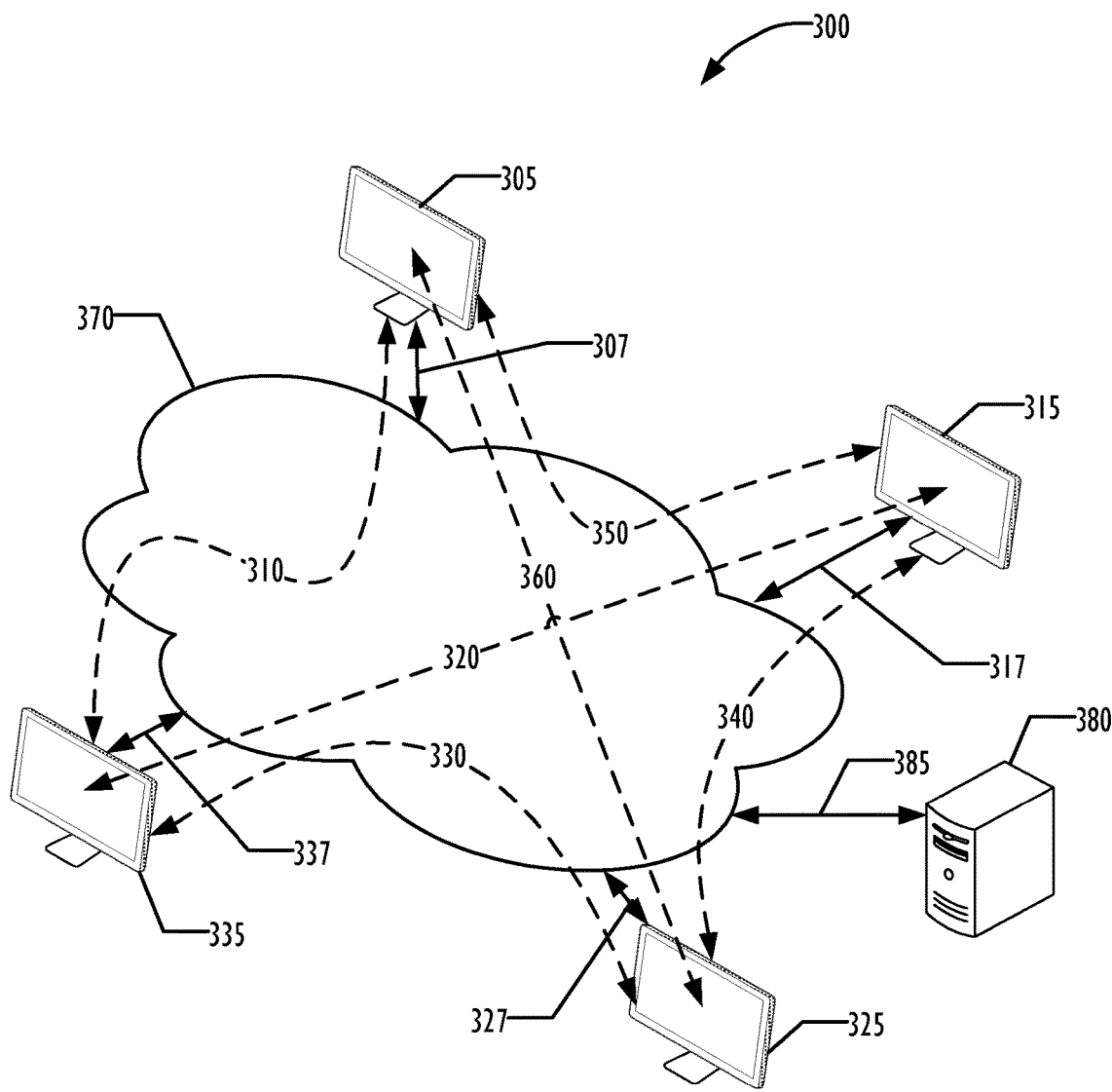
FIG. 3 is a block diagram of a system illustrating a mesh topology videoconferencing session according to one embodiment.
Figure 4:
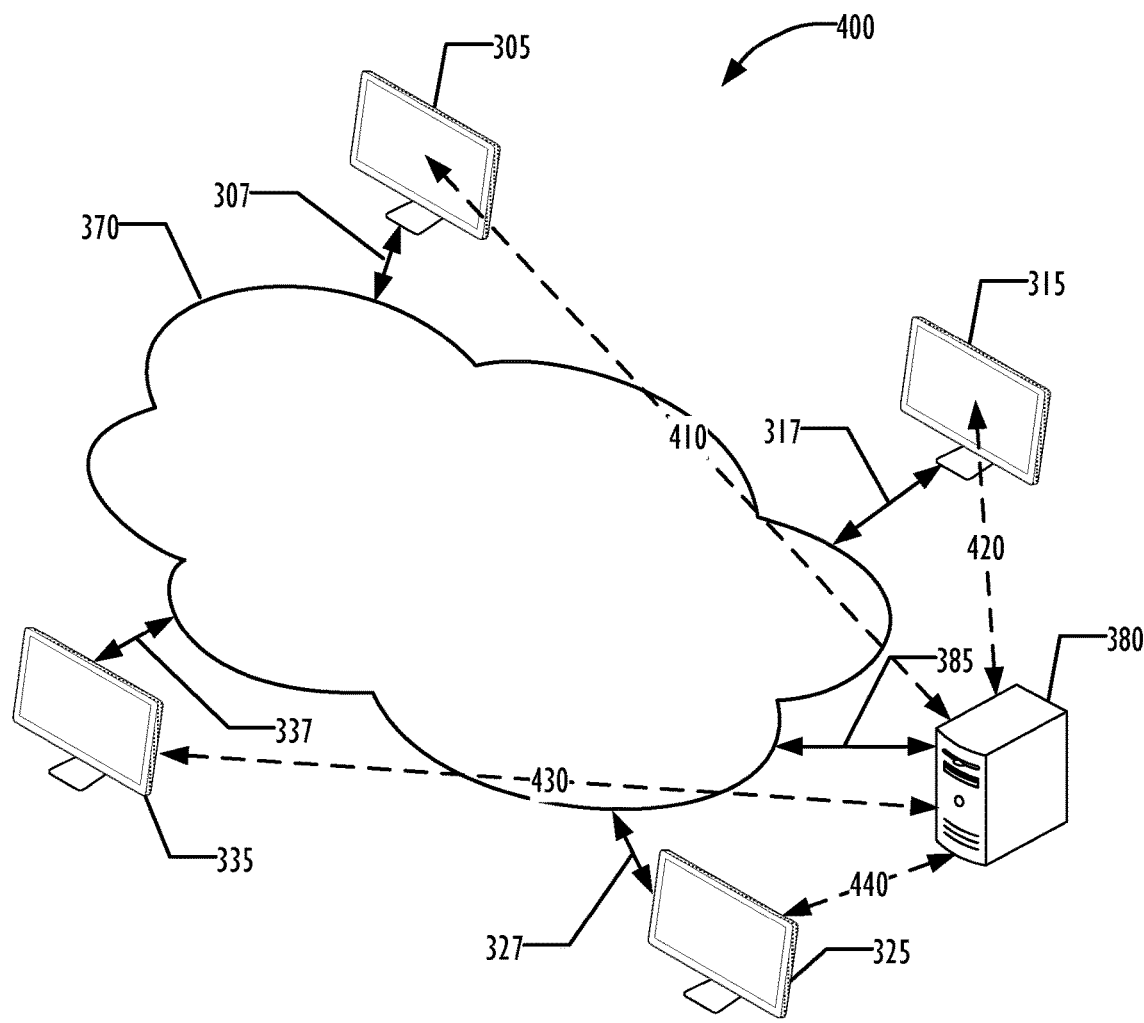
FIG. 4 is a block diagram of a system illustrating a bridge topology videoconferencing session according to one embodiment.

FIG. 3 is a block diagram illustrating a system 300 with videoconferencing sessions in a mesh topology according to one embodiment. FIG. 4 is 4 a block diagram illustrating a system 400 with videoconferencing sessions in a bridged topology according to one embodiment. Endpoints 305, 315, 325, and 335 are illustrated in FIG. 3 with mesh connections 310, 320, 330, 340, 350, and 360 through network 370, using links 307, 317, 327, and 337 between the network 370 and endpoints 305, 315, 325, and 335. Although illustrated as a single network 370, any number of interconnected networks can interconnect the endpoints 305, 315, 325, and 335. Although in this example centralized bridge 380 is present and connected to network 370 via link 385, the mesh connections do not pass through the bridge 380. In FIG. 4, the session has transitioned to a bridge topology in which connections 410, 420, 430, and 440 are made via bridge 380, instead of directly between endpoints 305, 315, 325, and 335. The number of endpoints is illustrative and by way of example only, and any number of endpoints may be used, subject to resource availability.

Although described above as audio-video conferencing sessions, the disclosed techniques may be used for audio-only conferencing sessions, and may include additional content data streams (not shown in FIGS. 3-4 for clarity). The endpoints 305, 315, 325, and 335 and centralized bridge 380 programmable devices that can interact as audio-video or audio-only conferencing endpoints or bridges, generally including one or more programmable processors and a memory coupled to the processor that stores instructions that when executed cause the programmable processors to perform the techniques described above. The instructions may be provided on one or more machine readable media that store the instructions for loading into the memory. Other details of the endpoints and bridges outside the scope of this disclosure, but are well known to those of skill in the art.

The techniques described above can be implemented using any type of triggering event or triggering point. In the following, various metrics are described for identifying a triggering point for switching between a mesh and a centralized conference according to various embodiments. A mechanism is also described to collect the metrics and calculate a weighted index of the criteria to determine the triggering point.

By definition, in a mesh conference call, each participant establishes a separate media connection with each other participant. This consumes lot of CPU cycles/processing power on device. It also consumes lot of network bandwidth.

In one embodiment, the following criteria may be considered while deciding whether to escalate a mesh call to a bridge call.

1. The number (N) of participants in the session. As more participants join the conference, the number of media streams maintained by each endpoint increases. This can create a bad user experience.

2. A device bandwidth limitation (D1) for the meshed endpoint. In some scenarios, an endpoint may have good capacity but network bandwidth may be limiting. In such scenarios, handling multiple media connections in that network can be a problem.

3. A device computational limitation (D2) for the meshed endpoint. Mobile devices may have a wide range of capacity. For example, a low end mobile device may not be capable of handling multiple media streams.

4. A device power consumption (D3) for the meshed endpoint. For endpoints that are mobile devices, the power which can consumed for computation may also be limited.

5. Mobility (M) of the device for the meshed endpoint. Where endpoints are mobile devices, network routing and NAT traversals also can change during the call. These can trigger significant Session Description Protocol (SDP) renegotiation between participants, which can create bad experiences for some users.

5. Bridge user joins (B). In this scenario, a bridge user wants to the join a conference call that is currently running in a meshed based conference call.

In one embodiment, the triggering point is a function of all the above criteria:

$$\text{Triggering point} = F(N, D1, D2, D3, M, B)$$

Embodiments of the function can be a simple weighted index or any other mathematical model which be configured in the system. To implement such a system, in some embodiments a conference monitor collects all the metrics from the endpoint devices, using agents or in an agentless way. The conference monitor can run real-time analytics on the metrics data received from all the endpoint devices and calculate the triggering point value $F(N, D1, D2, D3, M, B)$. If the calculated triggering point value exceeds a predetermined configurable threshold value, the conference monitor may trigger escalation to a bridge call. Similarly, if the triggering point value is below a predetermined configurable threshold value, the conference monitor may trigger a transition from a bridge call to a mesh call.

In one embodiment, the function used to determine the triggering point and the thresholds is customizable in the system. Different functions and thresholds may be assigned to different conferences as desired. For example, some functions may weight the various parameters, giving different weights to different parameters as desired. Other functions may omit one or more of the above parameters, and may include one or more other parameters not described above. Based on the criteria used and the weighting of the parameters, one or more optimal thresholds for a triggering point may be identified for each conference session. In some embodiments, a single threshold may be used for transitioning between mesh and bridged sessions. In other embodiments, a first threshold may be used for transitioning from a mesh a second threshold used for transitioning from a bridged session to a mesh session.

By employing the seamless transitioning techniques described above with the triggering points, embodiments of the disclosed system provide a better user experience performing the transitions without breaking the existing conversation.

Figure 5:
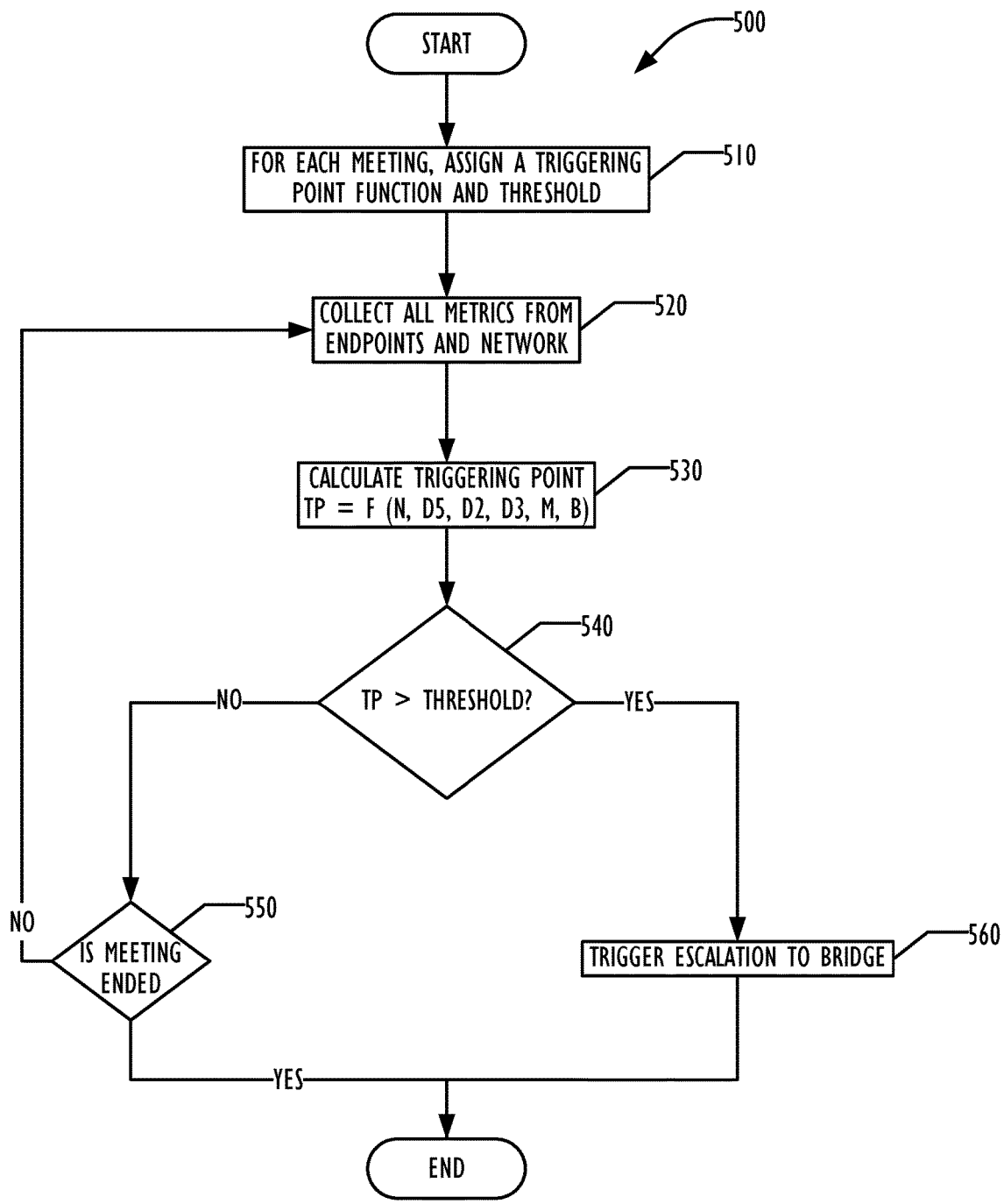
FIG. 5 is a flowchart illustrating a technique for triggering escalation of a mesh-based conference to a bridged conference according to one embodiment.

FIG. 5 is a flowchart 500 illustrating the technique outlined above according to one embodiment. In block 510, each conference is assigned a triggering point function and a trigger point threshold. In block 520, metrics relevant to the triggering point function are obtained from all endpoints in the conference. Metrics regarding network capacity and quality may also be obtained. The metrics may be collected with or without the use of agents, and some embodiments may use agents for collecting some metrics and not use agents for collecting other metrics. In block 530, the triggering point function is evaluated, in one embodiment applying metric data for the number of participants, device bandwidth limitations, device computational limitations, mobility of the devices, and bridge users. In block 540, the triggering point function value is evaluated against the threshold value. If the threshold is exceeded (or, in some embodiments, met), the conference is triggered to escalate to a bridged conference in block 560. If the triggering point value does not exceed (or meet) the threshold value, then in block 550 a check is made to determine whether the conference has ended. If not, then the technique repeats, beginning with the collection of metrics in block 520. If the conference has ended then the technique finishes. Although described in FIG. 5 as an escalation from a mesh session to a bridge session, the same technique may be used to trigger a transition from a bridge session to a mesh session.

FIGS. 6-11 illustrate additional embodiments for transitioning between a mesh session and a bridge session, using the triggering function disclosed above. In the following, the triggering function for clarity is devolved to a simple function of the number of participants, and the threshold is a number of participants N. However, the technique disclosed below is not limited to such a "number of participants" function.

Consider a meshed-based conference call with a threshold of N participants where currently there are N−1 active participants. When a new participant joins the conference call, the call needs to be escalated to a bridge call. This transition may be handled by an escalation manager, separate from the endpoints, as illustrated in FIGS. 6-9.

When a new participant tries to join the meshed conference call as a participant, the escalation manager redirects the new participant to a bridge directly. The escalation manager itself then joins the meshed conference as the Nth participant on the mesh side of the escalation manager with the MCU or bridge on the other side of the escalation manager. Over time, the call may move the meshed participants to the bridge side, providing for a seamless transition to a bridge conference.

Figure 6:
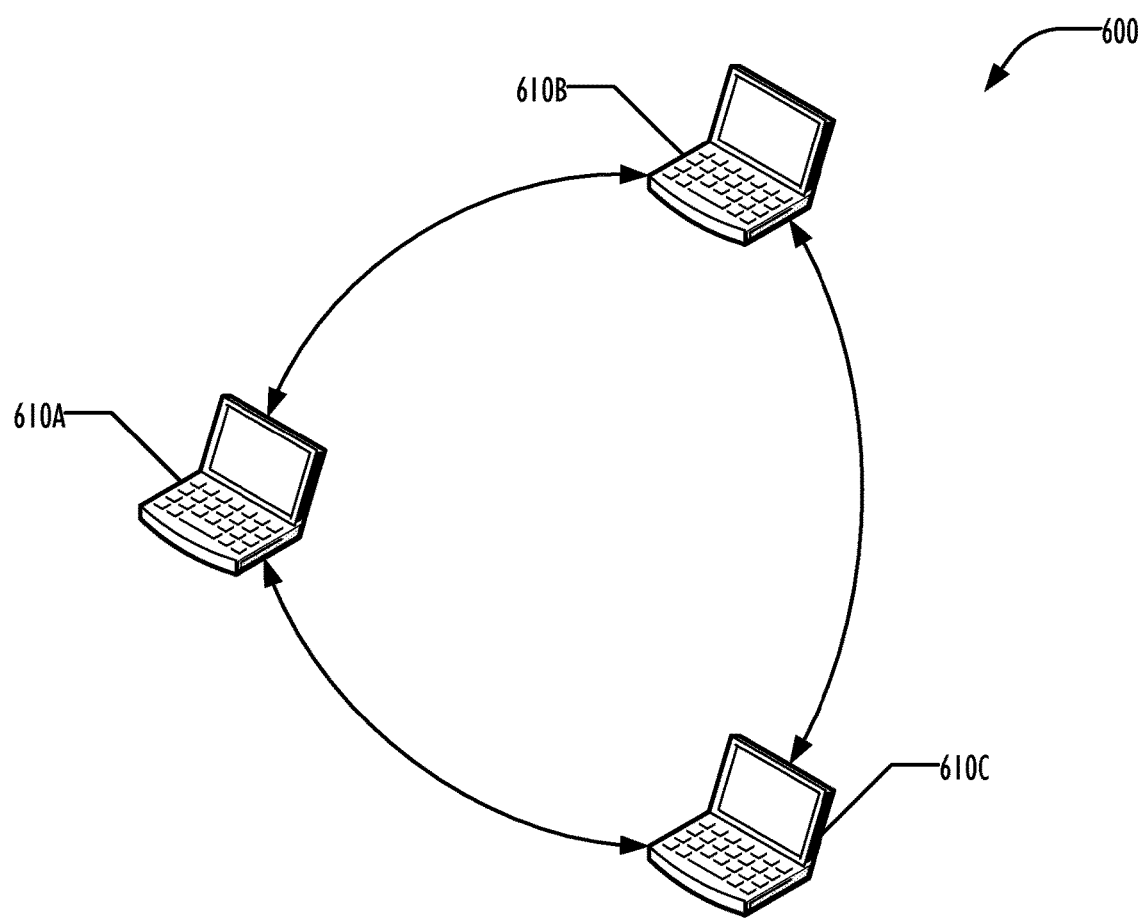
FIG. 6 is a block diagram illustrating a mesh-based conference according to one embodiment.

FIG. 6 is a block diagram illustrating a mesh-based conference session 600 among three endpoints 610A-C. In this simple example, the threshold for trigger an escalation to a bridge conference is 4 participants. Although illustrated as laptop computers in FIG. 5, the endpoints 610 may be any type of computational device, including mobile devices, each of which contain one or more processors and memory storing instructions that when executed cause the one or more processors to perform the disclosed actions. Although for clarity the endpoints 610 are shown directly connected to each other, typically the endpoints 610 are connected to each other via network connections across one or multiple networks (omitted in FIGS. 6-9), which may include cellular networks.

Figure 7:
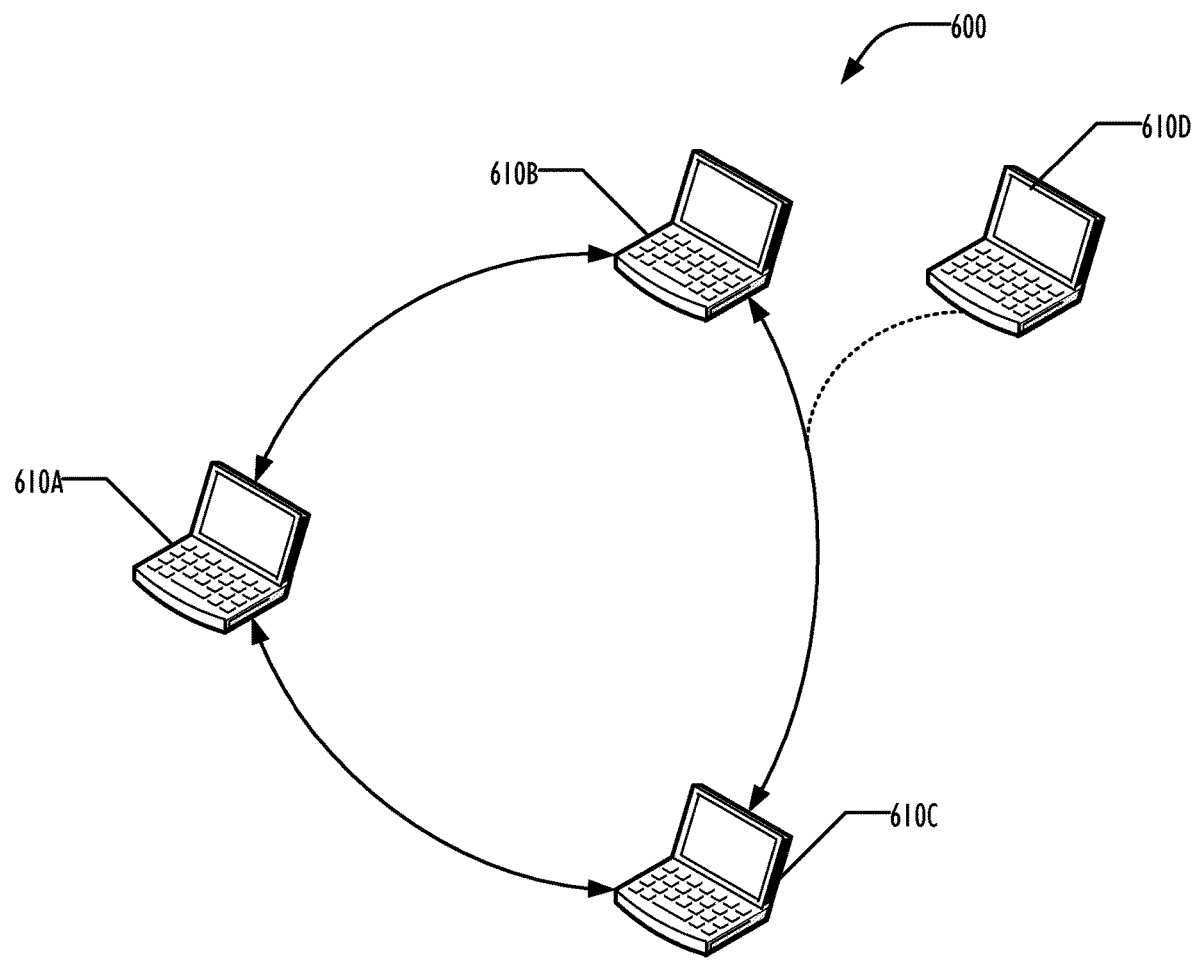
FIG. 7 is a block diagram illustrating another endpoint attempting to join the conference of FIG. 2.
Figure 8:
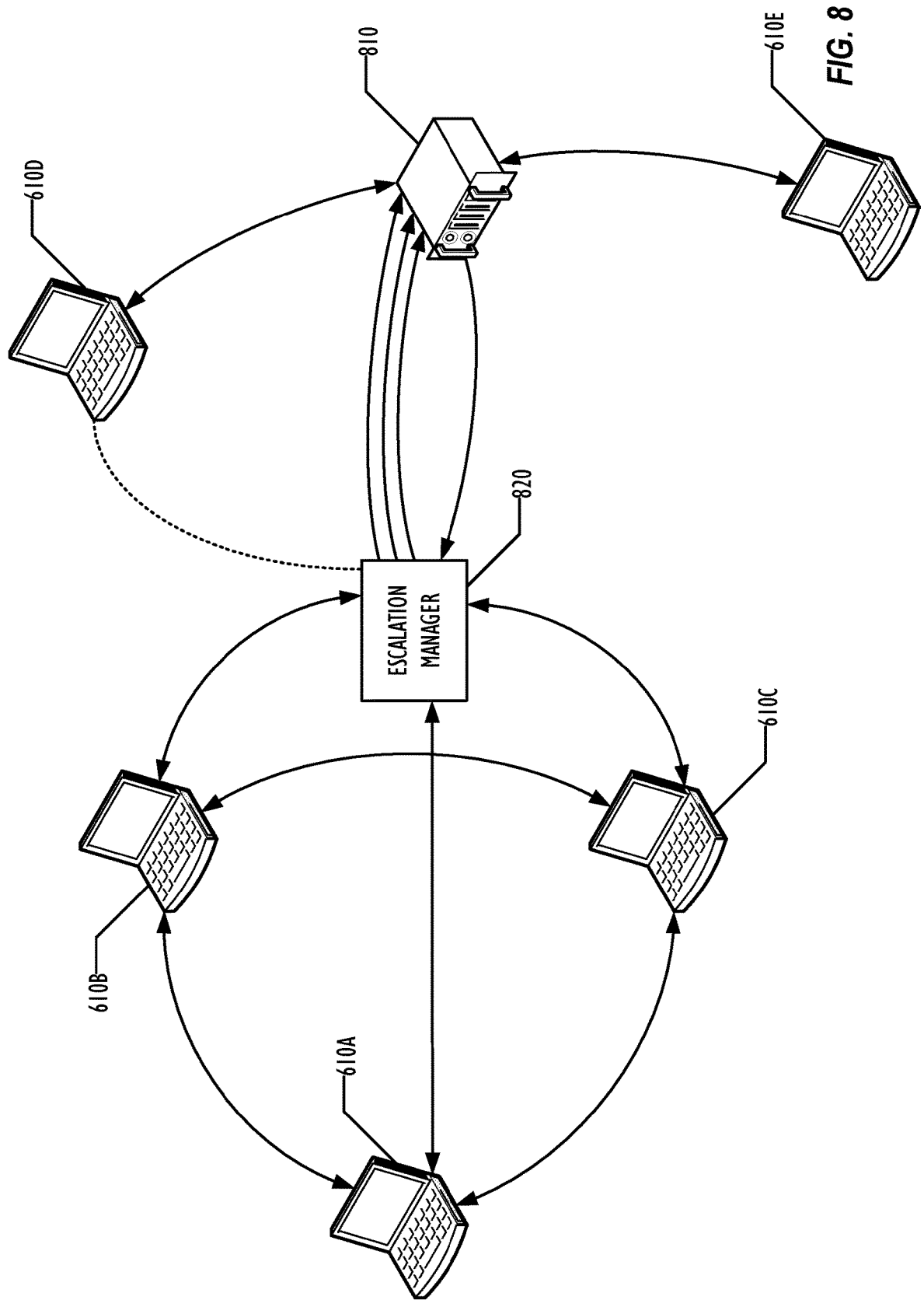
FIG. 8 is a block diagram illustrating use of an escalation manager according to one embodiment for managing the escalation of the mesh-based conference of FIG. 6 to a bridged conference.
Figure 9:
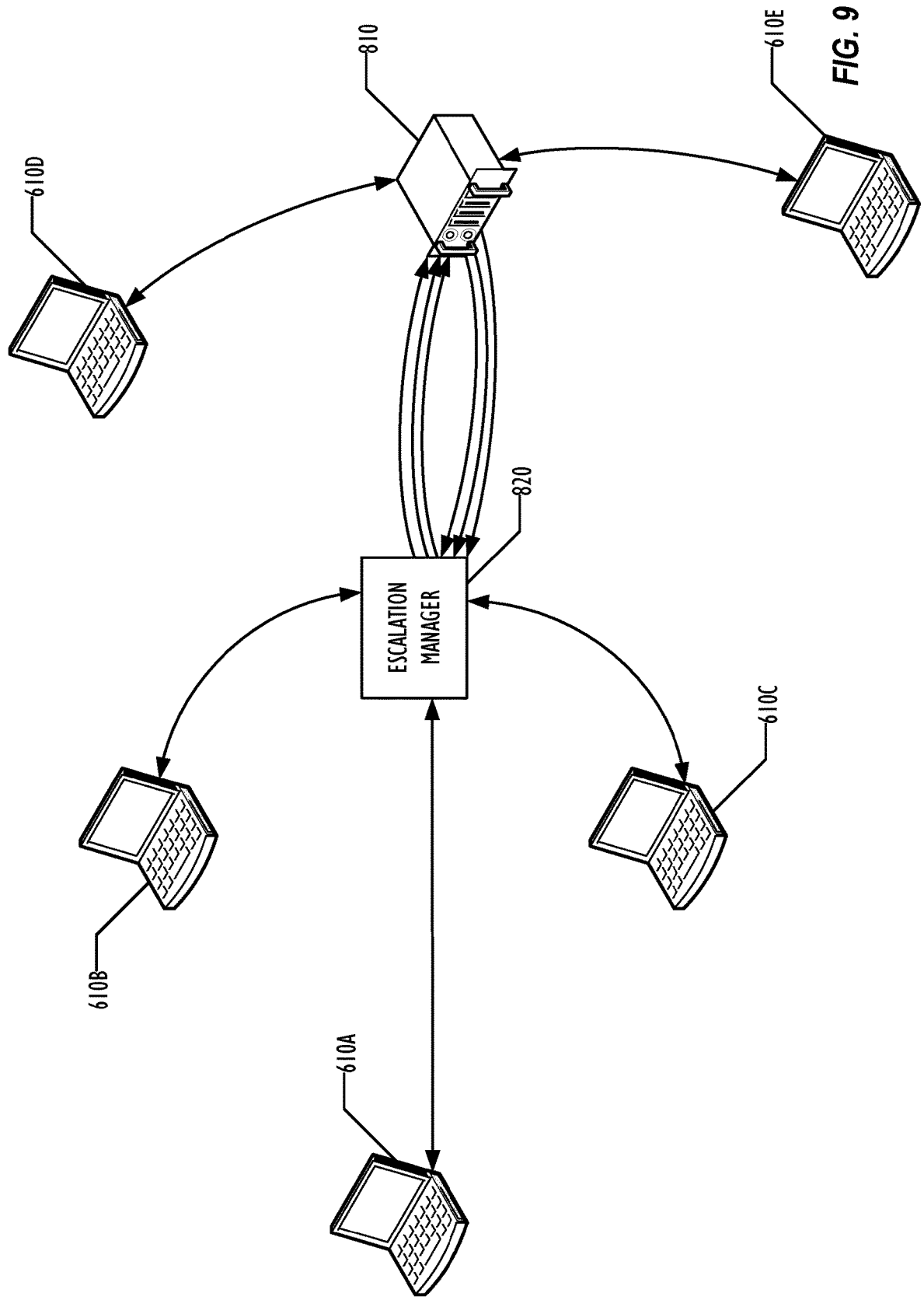
FIG. 9 is a block diagram of the conference of FIG. 8, transitioned to a fully bridged conference according to one embodiment.

In FIG. 7, new participant 610D attempts to join the conference session, which would bring the conference to the threshold number of participants. In this embodiment, an escalation manager comes into play as illustrated in FIGS. 8-9.

Endpoint 610D contacts the escalation manager 820, indicating a desire to join the conference with endpoints 610A-C. The escalation manager 820 directs endpoint 610D to connect to bridge 810, which may be a multipoint control unit (MCU), and establishes a connection between the endpoint manager 820 and the MCU 810. The escalation manager 820 also makes mesh connections with the other three endpoints 610A-C in the mesh conference, so that the conference is now a 4-way mesh conference.

On the bridge side of the call, the escalation manager 820 sends to the MCU 810 the multiple media streams received or gathered from all the other N−1 conference participants 610A-C in the meshed call. The MCU 810 sends a stitched audio-video stream of all the meshed conference participants' media to the newly added participant 610D. The MCU 810 also sends back to the escalation manager 820 an audio-video stream from endpoint 610D (the N+1st participant). The escalation manager 820 then forks the stream to all the meshed call participants 610A-C. In one embodiment, the escalation manager 820 adds a specific token for each media stream sent to the MCU 810, so that the MCU 810 does not consider the stream as media from a single source and does not send it back to the escalation manager 820 in the stitched video stream.

If yet another participant (in FIG. 8, endpoint 610E) joins the conference, that endpoint joins the bridge session only, connecting to the MCU 810. In one embodiment, the MCU 810 sends an additional media stream to the escalation manager 820 for each endpoint connected directly to the bridge 810. In other embodiments (such as the embodiment illustrated in FIG. 8), a single media stream is sent from the MCU 810 to the escalation manager, combining media streams from each of the participants connected directly to the bridge MCU 810.

The conference then continues as a mixed mesh-bridge conference. In one embodiment, the escalation manager 820 can decide if the entire meshed conference needs to move onto the MCU 810, using a triggering technique similar to the triggering technique described above. In other embodiments, the hybrid mesh-bridge conference may continue for the remainder of the conference session.

In one embodiment, the escalation manager 820 slowly stops the peer-to-peer media flow between meshed endpoints 610A-C, while directing or requesting the MCU 810 to add additional media streams for each endpoint 610A-C that drops mesh connections, as illustrated in FIG. 9. In such an embodiment, the escalation manager 820 may then function as a media relay MCU, relaying media streams to and from the MCU 810 as a proxy.

In one embodiment, the escalation manager 820 can monitor the conference, listening for active speakers. The escalation manager 820 may trigger a sequence for endpoints 610 corresponding to non-active speakers to drop their meshed connections. The escalation manager 820 also sends a notification to MCU 810, to cause the MCU 810 to start sending a separate stream intended for each endpoint 610 that is no longer part of the mesh. By snapping only non-active speaker endpoints from mesh to bridge conference connections, the conference transition appears seamless to the participant at the endpoint 610 whose connection has switched from mesh to bridged. Over time, this may result in the situation illustrated in FIG. 9, in which all of the formerly meshed endpoints 610A-C are connected as bridged endpoints via the escalation manager 820.

Figure 10:
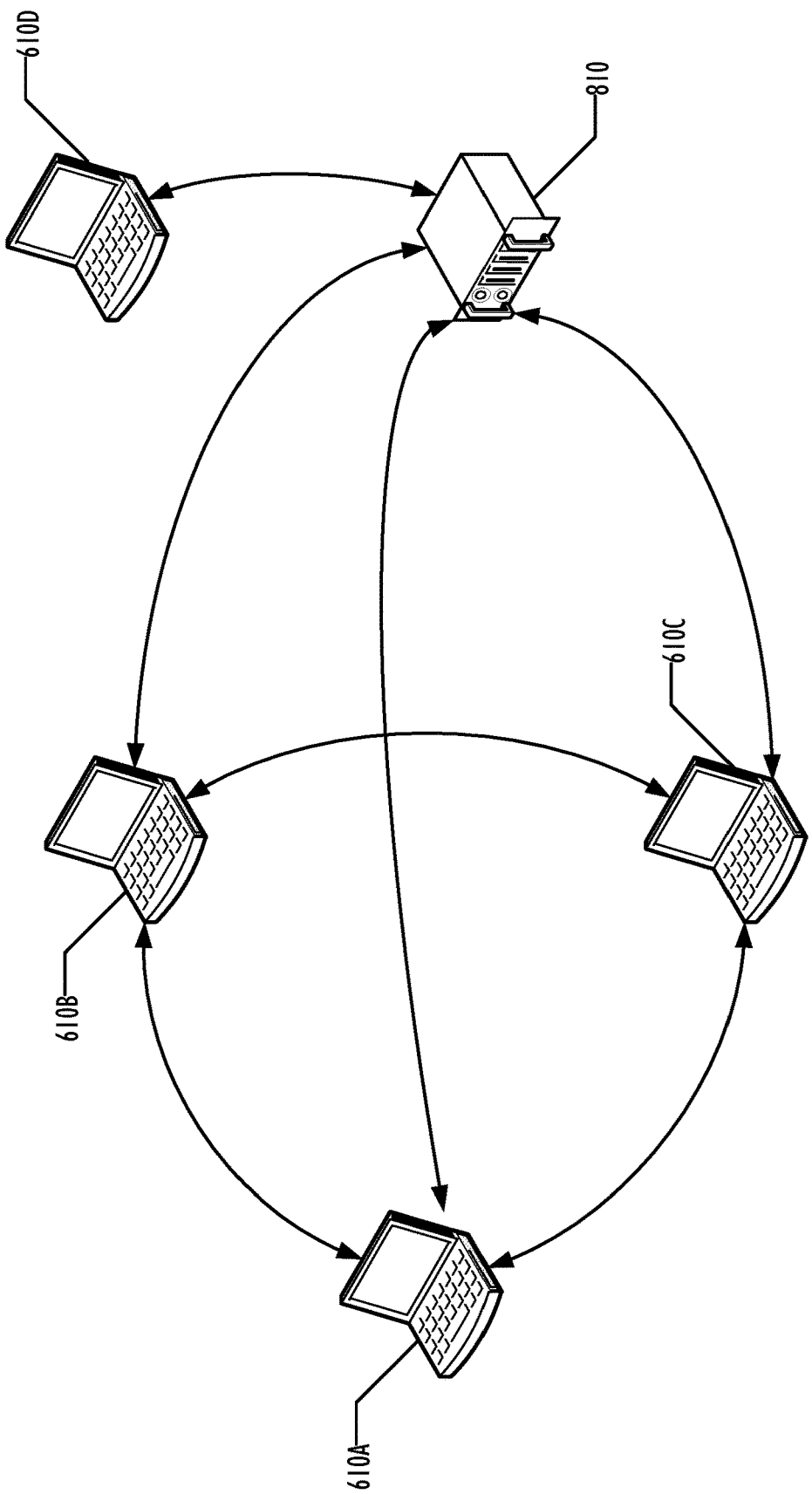
FIG. 10 is a block diagram of a mesh-based conference in transition to a bridged conference according to one embodiment.
Figure 11:
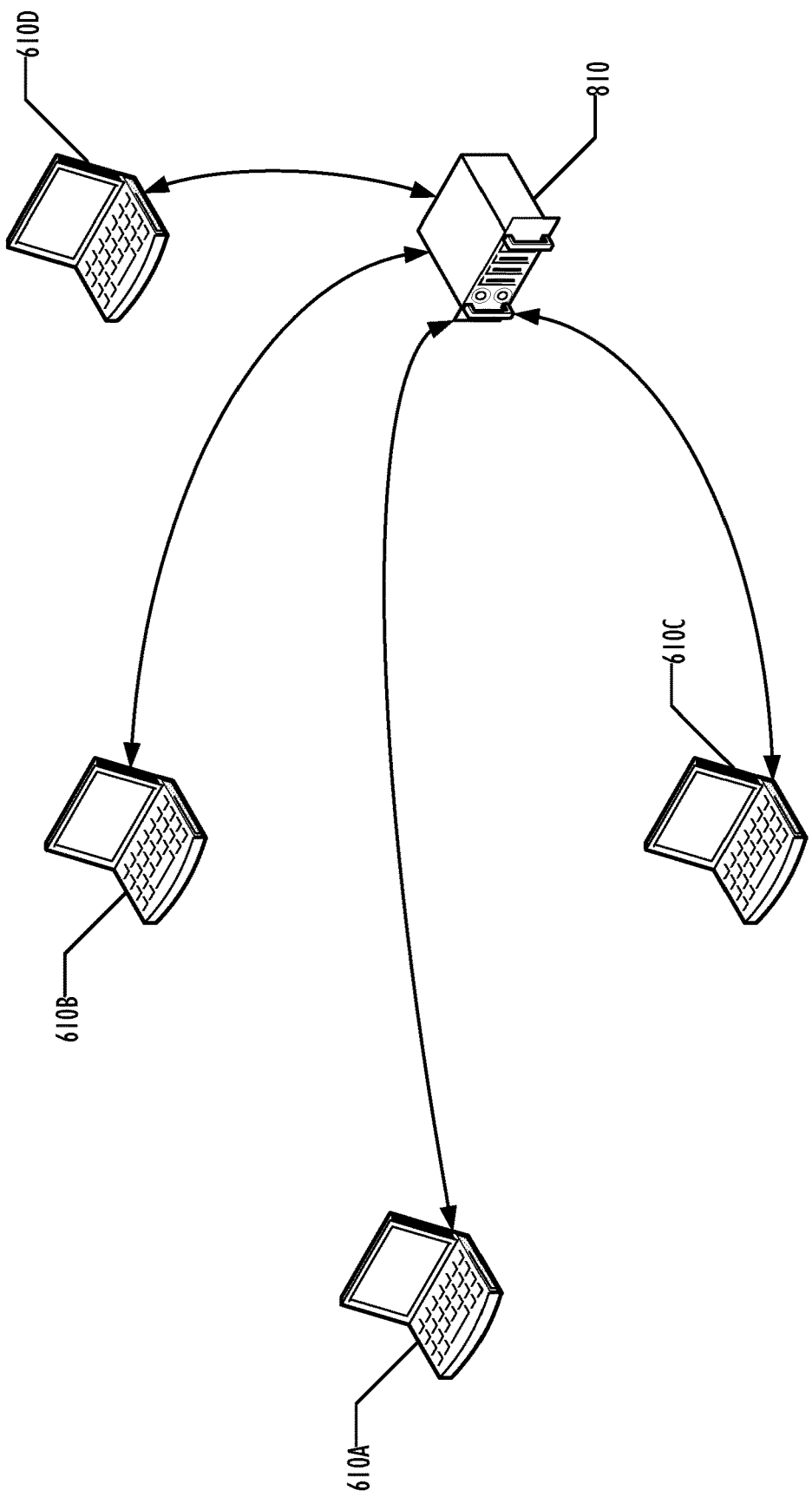
FIG. 11 is a block diagram of the conference of FIG. 10 after transitioning to a bridged conference.

In another embodiment, illustrated in FIGS. 10-11, no escalation manager 820 is used to relay media streams. In one embodiment, instead of escalation logic in a separate escalation manager 820, escalation logic is implemented in each of the endpoints 610A-D. In another embodiment, an escalation manager may be used, but serves only to direct the endpoints and MCU 810 to perform the escalation, instead of serving as a relay for streams. The conference starts out as a meshed conference as illustrated in FIG. 6. But in the embodiment of FIGS. 10-11, when endpoint 610C attempts to join the conference, escalation logic in each of the endpoints causes the MCU 810 to join the mesh conference as the Nth participant and endpoint 610D (the N+1st endpoint) to join the conference directly on the MCU 810, as illustrated in FIG. 10.

Then, over time when each of endpoints 610A-C is not an active speaker, that endpoint 610 drops its mesh connections to the other endpoints 610, and communicates only through the MCU 810, eventually resulting in the fully bridged conference of FIG. 11.

As illustrated in FIG. 10, all the current mesh-based conference participants 610A-C dial into the bridge MCU 810 while keeping their meshed call legs up and running. This ensures that the running conversation is not broken.

In one embodiment, the call to join the MCU 810 may contain a specific flag or identifier which will enables the MCU 810 to consider all the media coming from the original N−1 participants, endpoints 610A-C, as media coming from a special source that is treated logically as a single entity. In this embodiment, the media stream sent by the MCU 810 to the mesh-based participant endpoints 610A-C does not contain any audio or video of the meshed endpoints 610A-C, but only media from the participants that have joined the conference call directly on the MCU 810.

However, endpoint 610D, which is hosted on the MCU 810, receives media streams from the MCU 810 from all of the meshed conference participants 610A-C and any other bridge-connected participant from the bridge.

Similar to the transition illustrated in FIGS. 8-9, as the conference progresses, at a given point of time there may be a subset m of the N participants that are active speakers. Leaving the m active speakers untouched, escalation logic in the endpoints 610A-C can remove the rest of the other N-m participants from the meshed call. In one embodiment, this is performed sequentially, one by one, by the following procedure.

First, the existing peer-to-peer connection legs (with meshed users) are removed for an endpoint that is to transition to fully-bridged mode. Next, a notification is sent to the MCU 810 to remove that participant from the single source context, so that the MCU sends the endpoint media for all the other participants in the conference, not just the bridge-only participants.

After applying the above steps, endpoints without active speakers may transition smoothly to the MCU 810 by simply turning off their meshed connections and detaching from the common source context.

In one embodiment, all the meshed users join the call on the MCU 810 with a special key (for example, shared in Session Initiation Protocol or Session Description Protocol), that enables the MCU 810 to keep the Real-Time Protocol (RTP) media streams coming from meshed endpoints into a single source.

By keeping RTP into the same context/source, while stitching the media, the MCU 810 does not send back the meshed participants media in the stitched stream.

For example, using the example illustrated in FIGS. 10-11, endpoints 610A-C are on the meshed call; thus, they are directly getting media streams from each other. When endpoint 610D joins the call on the MCU 810, escalation happens and endpoints 610A-C send an SDP Invite to MCU 810 containing their audio video ports. In this Invite, endpoints 610A-C share a common key, allowing the MCU 810 to keep the RTP media streams coming from these endpoints as an RTP stream coming from a single source. Therefore, the MCU 810 does not send the stitched media back to the endpoints 610A-C, preventing echoing their streams back to the meshed endpoints 610A-C that are still talking to each other over their mesh connections.

New participant endpoint 610D, however, gets the media from all the meshed endpoints 610A-C and all the meshed endpoints 610A-C get media from endpoint 610D as a conference participant in the stitched video coming back to the endpoints 610A-C from the MCU 810. When any of the endpoints 610A-C transitions from mesh to bridged connections, the media stream from that endpoint no longer contains the special key, causing the MCU 810 to include media from that endpoint in the stitched media stream. Once that happens, the endpoints may simply drop their mesh connections.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium, on which are stored instructions, comprising instructions that when executed cause a conferencing endpoint to:
   determine a mesh to bridge conference triggering event has occurred in a conferencing session with a plurality of other conferencing endpoints;
   establish a bridge connection between the conferencing endpoint and a bridge responsive to the determination, the bridge connection configured for two-way audio-video communication between the conferencing endpoint and the bridge;
   notify the plurality of other conferencing endpoints that the conferencing endpoint has transitioned from a mesh connection to the bridge connection;
   listen for a notification from a second conferencing endpoint of the plurality of other conferencing endpoints indicating the second conferencing endpoint has transitioned from a mesh connection to a bridge connection;
   determine that a notification indicating the second conferencing endpoint has transitioned from a mesh connection to a bridge connection has been received;
   tear down a mesh connection between the conferencing endpoint and the second conferencing endpoint after notifying the plurality of other conferencing endpoints that the conferencing endpoint has transitioned from a mesh connection to the bridge connection and determining that a notification indicating the second conferencing endpoint has transitioned from a mesh connection to a bridge connection has been received; and
   track which of the plurality of other conferencing endpoints have transitioned from mesh connections to bridge connections.

2. The machine readable medium of claim 1,
   wherein the bridge connection is initially muted, and
   wherein the bridge connection is unmuted responsive to an active speaker endpoint of the plurality of conferencing endpoints transitioning from a mesh connection to a bridge connection.

3. The machine readable medium of claim 1, wherein the instructions further comprise instructions that when executed cause the conferencing endpoint to:
   complete transitioning from a mesh connection to a bridge connection responsive to receiving notifications that all of the plurality of other conferencing endpoints have transitioned from a mesh connection to a bridge connection.

4. The machine readable medium of claim 1, wherein the mesh to bridge conference triggering event comprises a function of one or more metrics.

5. The machine readable medium of claim 4, wherein a metric of the one or more metrics comprises how many conferencing endpoints are connected to the conferencing session.

6. The machine readable medium of claim 4, wherein the instructions that when executed cause the conferencing endpoint to determine whether the mesh to bridge conference triggering event has occurred comprise instructions that when executed cause the conferencing endpoint to determine the mesh to bridge conference triggering event has occurred responsive to the function exceeding a threshold value.

7. A non-transitory machine readable medium, on which are stored instructions, comprising instructions that when executed cause a conferencing endpoint to:
   determine a bridge to mesh conference triggering event has occurred in a conferencing session with a plurality of other conferencing endpoints;
   set up mesh connections with the plurality of other conferencing endpoints;
   notify each of the plurality of other conferencing endpoints that the conferencing endpoint has transitioned from the bridge conference to a mesh conference;
   listen for notifications from the plurality of other conferencing endpoints that the plurality of other conferencing endpoints has transitioned from the bridge conference to the mesh conference;
   determine that notifications indicating all of the plurality of other conferencing endpoints have transitioned from the bridge conference to a mesh conference have been received; and
   tear down a connection to a bridge after notifying the plurality of other conferencing endpoints that the conferencing endpoint has transitioned from the bridge conference to the mesh conference and determining that notifications indicating all of the plurality of other conferencing endpoints have transitioned from a bridge conference to a mesh conference have been received.

8. The machine readable medium of claim 7, wherein the instructions that when executed cause the conferencing endpoint to set up the mesh connections comprise instructions that when executed cause the conferencing endpoint to:
   mute mesh connection audio from the plurality of other conferencing endpoints; and
   mute audio from the conferencing endpoint on the mesh connections to the plurality of other conferencing endpoints.

9. The machine readable medium of claim 8, wherein the instructions further comprise instructions that when executed cause the conferencing endpoint to:
   unmute mesh connection audio from the plurality of other conferencing endpoints responsive to all of the plurality of other conferencing endpoints having transitioned from the bridge conference to the mesh conference; and
   unmute audio from the conferencing endpoint on the mesh connections to the plurality of other conferencing endpoints, responsive to all of the plurality of other conferencing endpoints having transitioned from the bridge conference to the mesh conference.

10. The machine readable medium of claim 8, wherein the bridge to mesh conference triggering event comprises a function of one or more metrics.

11. The machine readable medium of claim 10, wherein a metric of the one or more metrics comprises how many conferencing endpoints are connected to the conferencing session.

12. The machine readable medium of claim 10, wherein instructions that when executed determine whether the bridge to mesh conference triggering event has occurred comprise instructions that when executed cause the conferencing endpoint to determine the bridge to mesh conference triggering event has occurred responsive to the function not exceeding a threshold value.

13. An escalation manager, comprising:
   a processing element;
   a memory, coupled to the processing element, on which are stored instructions that when executed cause the processing element to:
      receive an indication from a conferencing endpoint wanting to join a mesh conferencing session having a plurality of other conferencing endpoints;
      determine that the conferencing endpoint would bring the mesh conferencing session to a threshold number of endpoints;
      direct the conferencing endpoint to connect to a bridge;
      establish a connection between the bridge and the escalation manager;
      establish mesh connections with each of the plurality of other conferencing endpoints;
      forward media streams received from the plurality of other conferencing endpoints via the mesh connections to the bridge, for forwarding to the conferencing endpoint; and
      forward media streams received from the bridge via the mesh connections to the plurality of other conferencing endpoints.

14. The escalation manager of claim 13, wherein the instructions further comprise instructions that when executed cause the processing element to:
   transition the conferencing session with the plurality of other conferencing endpoints to the bridge.

15. The escalation manager of claim 13, wherein the escalation manager comprises a media relay multipoint control unit.

16. A method of transitioning a mesh conference to a bridge conference, comprising:
   determining that a trigger event has occurred;
   establishing a connection to a bridge;
   notifying other endpoints of the mesh conference of a transition from the mesh conference to a bridge conference;
   receiving a notification from the other endpoints of the mesh conference that the other endpoints have transitioned from the mesh conference to the bridge conference;
   determining that a notification that a given other endpoint has transitioned from the mesh conference to the bridge conference has been received; and
   dropping connections with the given other endpoint of the mesh conference after notifying other endpoints that the conferencing endpoint has transitioned from the mesh conference to the bridge conference and determining that a notification that the given other endpoint has transitioned from the mesh conference to the bridge conference has been received.

17. The method of claim 16, further comprising:
   hiding and muting video and audio received from the bridge until a notification is received that an active speaker endpoint of the other endpoints has transitioned from the mesh conference to the bridge conference.

18. The method of claim 16, wherein the trigger event comprises a function of a predetermined one or more metrics exceeds a threshold value.

19. A method of transitioning a bridge conference to a mesh conference, comprising:
   determining that a trigger event has occurred;
   establishing mesh connections with other endpoints of the bridge conference;
   notifying the other endpoints of the transition to a mesh conference;
   receiving notifications from the other endpoints that the other endpoints have transitioned from the bridge conference to the mesh conference;
   determining that notifications indicating all of the other endpoints have transitioned from the bridge conference to a mesh conference have been received; and
   dropping a bridge connection after notifying the other endpoints that the endpoint has transitioned from the bridge conference to the mesh conference and determining that notifications indicating all of the other endpoints have transitioned from the bridge conference to a mesh conference have been received.

20. The method of claim 19, further comprising:
   hiding and muting audio and video on the mesh connections until notifications are received from all of the other endpoints that the other endpoints have transitioned from the bridge conference to the mesh conference.

* * * * *